(12) United States Patent
Jang

(10) Patent No.: US 12,465,627 B2
(45) Date of Patent: Nov. 11, 2025

(54) IMMUNITY-BOOSTING AGENT, IMMUNO-THERAPEUTIC ANTI-CANCER AGENT, AND ANTI-CANCER THERAPY ADVERSE EFFECT MITIGATING AGENT CONTAINING ANTHOCYANIN-FUCOIDAN COMPLEX AS ACTIVE INGREDIENT

(71) Applicant: JBKLAB CO., LTD., Seongnam-si (KR)

(72) Inventor: Bong Keun Jang, Yongin-si (KR)

(73) Assignee: JBKLAB CO., LTD., Seongnam-si (KR)

( * ) Notice: Subject to any disclaimer, the term of this patent is extended or adjusted under 35 U.S.C. 154(b) by 71 days.

(21) Appl. No.: 18/087,842

(22) Filed: Dec. 23, 2022

(65) Prior Publication Data

US 2023/0132001 A1 Apr. 27, 2023

Related U.S. Application Data

(63) Continuation of application No. 16/759,364, filed as application No. PCT/KR2018/012849 on Oct. 26, 2018, now abandoned.

(30) Foreign Application Priority Data

Oct. 27, 2017 (KR) .................. 10-2017-0141184
Oct. 26, 2018 (KR) .................. 10-2018-0128919

(51) Int. Cl.
| | | |
|---|---|---|
| *A61K 36/73* | (2006.01) | |
| *A61K 31/737* | (2006.01) | |
| *A61K 47/61* | (2017.01) | |
| *A61P 35/00* | (2006.01) | |

(52) U.S. Cl.
CPC ............ *A61K 36/73* (2013.01); *A61K 31/737* (2013.01); *A61K 47/61* (2017.08); *A61P 35/00* (2018.01)

(58) Field of Classification Search
None
See application file for complete search history.

(56) References Cited

U.S. PATENT DOCUMENTS

2010/0330211 A1* 12/2010 Mower ................. A61P 3/10
424/766
2015/0140112 A1 5/2015 Choi et al.

FOREIGN PATENT DOCUMENTS

| | | |
|---|---|---|
| JP | 2003-192603 A | 7/2003 |
| JP | 2008-532555 A | 8/2008 |
| JP | 2012-526083 A | 10/2012 |
| KR | 10-2012-0000388 A | 1/2012 |
| KR | 10-2013-0130573 A | 12/2013 |
| KR | 10-2015-0066004 A | 6/2015 |
| KR | 10-2016-0092631 A | 8/2016 |
| WO | 2006-076387 A2 | 7/2006 |

OTHER PUBLICATIONS (From IDS, Fucoidan Based Nanocomplex for Improving Antioxidant Activity of Anthocyanin, Biomaterials Research, May 9, 2012, 16(2): 60-66) (Year: 2012).*
International Search Report for PCT/KR2018/012849 mailed May 10, 2019 from Korean Intellectual Property Office.
Min, D. H. et al., "Fucoidan Based Nanocomplex for Improving Antioxidant Activity of Anthocyanin", Biomaterials Research, 2012, vol. 16, No. 2, pp. 60-66.
Choung, M. G. et al., "Antioxidant, Anticancer and Immune Activation of Anthocyanin Fraction from *Rubus coreanus* Miquel fruits (Bokbunja)", Korean J. Medicinal Crop Sci., 2012, vol. 20, No. 4, pp. 259-269.
Yu et al., "The regulation of Shisonin and Cyanidin on the proliferating pattern of immunologic effector cells", Chinese Journal of Immunology, Dec. 31, 2012, vol. 28, pp. 522-529.

* cited by examiner

*Primary Examiner* — Terry A McKelvey
*Assistant Examiner* — Jacob A Boeckelman
(74) *Attorney, Agent, or Firm* — Revolution IP, PLLC

(57) ABSTRACT

The present invention relates to a composition including an anthocyanin-fucoidan complex formed by ionic bond between anthocyanin and fucoidan as an active ingredient, and more particularly, it is confirmed that the anthocyanin-fucoidan complex in which anion of the fucoidan, which is a natural extract having high biocompatibility and biodegradability, is ionically bonded with a cation of the anthocyanin improves the stability and the solubility of the anthocyanin even in acidic conditions in vivo, thereby increasing the immune activity in vivo and therefore it is intended to provide the anthocyanin-fucoidan complex as an immune enhancer, an immune-cancer agent and an anticancer adjuvant composition for alleviating side effects of anti-cancer agents.

1 Claim, 18 Drawing Sheets

BALB/c : n = 5
Doxorubicin (DOX) injection : 10 mg/kg at 0, 5 day
Fucoidan (Fu) : 1,600 mg/kg for everyday
Aronia Bio-active Fractions (ABF) : 200 mg/kg for everyday
Cyaplex-F8 : Fu (1,600 mg/kg) + ABF (200 mg/kg) for everyday
P value ($p^* < 0.001$, $p^{**} < 0.05$)

IMMUNITY-BOOSTING AGENT, IMMUNO-THERAPEUTIC ANTI-CANCER AGENT, AND ANTI-CANCER THERAPY ADVERSE EFFECT MITIGATING AGENT CONTAINING ANTHOCYANIN-FUCOIDAN COMPLEX AS ACTIVE INGREDIENT

CROSS REFERENCE TO PRIOR APPLICATION

This application is a Continuation of U.S. patent application Ser. No. 16/759,364 filed on Aug. 13, 2020, which is a National Stage Patent Application of PCT International Patent Application No. PCT/KR2018/012849 filed on Oct. 26, 2018, which claims priority to Korean Patent Application Nos. 10-2018-0128919 filed on Oct. 26, 2018 and 10-2017-0141184 filed on Oct. 27, 2017 which are all hereby incorporated by reference in their entirety.

BACKGROUND

The present invention relates to an immune enhancer and an anticancer adjuvant composition for relieving side effects of anticancer drugs comprising anthocyanin-fucoidan complex as an active ingredient, which is formed by ionic bonding between the anthocyanin and the fucoidan.

With the goal of conquering cancer, extensive research worldwide is being conducted for patient-specific precision medicine based on various factors such as next-generation sequencing (NGS)-based cancer genome analysis and the environment, but cancer disease is recognized as a fearful disease that is still difficult to treat and can lead to death. Even if it is treated with anticancer drugs, it was reported that the recurrence rate for gastric cancer is 55%, colon cancer is 20-50%, lung cancer is 20-50%, uterine cancer is 5-20% and breast cancer is 10-15% (National Cancer Center).

Immune response refers to cellular and humoral reactions for checking self and non-self and removing the non-self, and when immunity decreases, it cannot perform its original function and eventually our body is easily infected with foreign substances. In the case of cancer, immune cells involved in immunity cannot attack cancer cells due to reduced immune activity, and thus cancer cannot be removed.

Anthocyanin is a natural pigment glycoside mainly contained in plant flowers and fruits, and is contained a lot in plants such as blackcurrant, blueberry, aronia, cherry, black rice, grape and red cabbage. High concentrations of anthocyanins are found mainly in strong sunlight UV rays, harsh cold and high humidity environments, because intense sunlight UV rays destroy the DNA of plant cell nuclei and affect plant life, thus anthocyanins, which are a UV absorber, are produced on the surface or the middle layer of the plant for the protection which are protected.

It is known that such anthocyanins are easy to extract from natural products and thus can be mass-produced, and have excellent pharmacological activity in aging, immune response, diabetes, bacterial infections, nervous system diseases, and cancer. Accordingly, people are increasingly interested in anthocyanins and the market size of anthocyanin-containing products is gradually increasing due to the global well-being craze.

Anthocyanin has the greatest effect when ingested as food, but it exhibits a low activity of 5% or less in vivo due to a long residence time in the gastrointestinal tract, low intestinal wall permeability, low solubility, instability during the process for commercialization, or temperature, ambient oxygen and light, pH in the digestive tract and enzymes or other nutrients.

Accordingly, there is a need for research and development for anthocyanin that can be used as an effective anticancer drug by improving the in vivo stability of anthocyanin, a natural product extracted from a plant such as aronia, to enhance immune function.

In order to solve the above problems, the present invention provides an anthocyanin complex having improved stability and solubility by ionic bonding fucoidan, which is a natural extract, with anthocyanin, as an immune enhancer, an immune-cancer agent and an anticancer adjuvant composition for alleviating side effects of anti-cancer agents.

SUMMARY

The present invention provides an aronia extract-fucoidan complex comprising an aronia extract and a fucoidan, wherein an ionic bond is formed between a cation of a cyanidine of the aronia extract and an anion of the fucoidan, and $\pi$-$\pi$ bonds are formed between the cyanidine molecules.

The present invention provides an immune enhancer comprising an aronia extract-fucoidan complex composed with an aronia extract and a fucoidan, wherein an ionic bond is formed between a cation of a cyanidine of the aronia extract and an anion of the fucoidan, and $\pi$-$\pi$ bonds are formed between the cyanidine molecules, as an active ingredient.

The present invention provides an immune anticancer drug comprising an aronia extract-fucoidan complex composed with an aronia extract and a fucoidan, wherein an ionic bond is formed between a cation of a cyanidine of the aronia extract and an anion of the fucoidan, and $\pi$-$\pi$ bonds are formed between the cyanidine molecules, as an active ingredient.

The present invention provides a health food for anticancer comprising an aronia extract-fucoidan complex composed with an aronia extract and a fucoidan, wherein an ionic bond is formed between a cation of a cyanidine of the aronia extract and an anion of the fucoidan, and $\pi$-$\pi$ bonds are formed between the cyanidine molecules, as an active ingredient.

In addition, the present invention provides an anticancer adjuvant containing an anthocyanin-fucoidan complex comprising an aronia extract-fucoidan complex composed with an aronia extract and a fucoidan, wherein an ionic bond is formed between a cation of a cyanidine of the aronia extract and an anion of the fucoidan, and $\pi$-$\pi$ bonds are formed between the cyanidine molecules, as an active ingredient.

According to the present invention, it is confirmed that the aronia extract-fucoidan complex in which anion of the fucoidan, which is a natural extract having high biocompatibility and biodegradability, is ionically bonded with a cation of the anthocyanin improves the stability and the solubility of the anthocyanin even in acidic conditions in vivo, thereby increasing the immune activity of the tumor animal model and restoring the body weight reduced by treatment with anticancer drugs and thus extending the life span, and therefore it is intended to provide the aronia extract-fucoidan complex as an immune enhancer, an immune-cancer agent and an anticancer adjuvant composition for alleviating side effects of anti-cancer agents.

DETAILED DESCRIPTION

Hereinafter, the present invention will be described in more detail.

The present inventors have confirmed that a complex can be produced by ionically binding an anion of fucoidan having biocompatibility with a cation of cyanidin, an anthocyanin derived from *aronia* to structurally stabilize the cyanidine in the stomach, small intestine, and blood, and to improve immune activity under conditions similar to the body and to provide as a complex having excellent bioavailability and physiological activity and thus they have completed the present invention.

The present invention may provide an *aronia* extract-fucoidan complex comprising an *aronia* extract and a fucoidan, wherein an ionic bond is formed between a cation of a cyanidine of the *aronia* extract and an anion of the fucoidan, and π-π bonds are formed between the cyanidine molecules.

More specifically, the cyanidine may be cyanidine-3-glucoside (C3G) separated and purified from an *aronia* extract, but it is not limited thereto.

The anthocyanin of the present invention is a combination of the Greek words Anthos meaning flower and cyanos meaning blue, and anthocyanin pigment, a type of phytochemical is produced in the fruits, flowers, and stems of berry to protect themselves from external stimuli. About 600 species of these anthocyanins exist in nature, and among these, cyanidin-3-glucoside (C3G) has the best activity and particularly, anti-aging, antioxidant, anti-cancer, and anti-metabolism thereof are excellent.

The complex may be formed in a weight ratio of 0.1:10 to 10:0.1 of the *aronia* extract and the fucoidan.

The complex may be a nanocomposite having an average diameter in a range of 50 nm to 500 nm.

The present invention may provide an immune enhancer comprising an *aronia* extract-fucoidan complex composed with an *aronia* extract and a fucoidan, wherein an ionic bond is formed between a cation of a cyanidine of the *aronia* extract and an anion of the fucoidan, and π-π bonds are formed between the cyanidine molecules, as an active ingredient.

The *aronia* extract-fucoidan complex may induce an expression of immune factors to increase an activity of immune cells.

Figure 6:
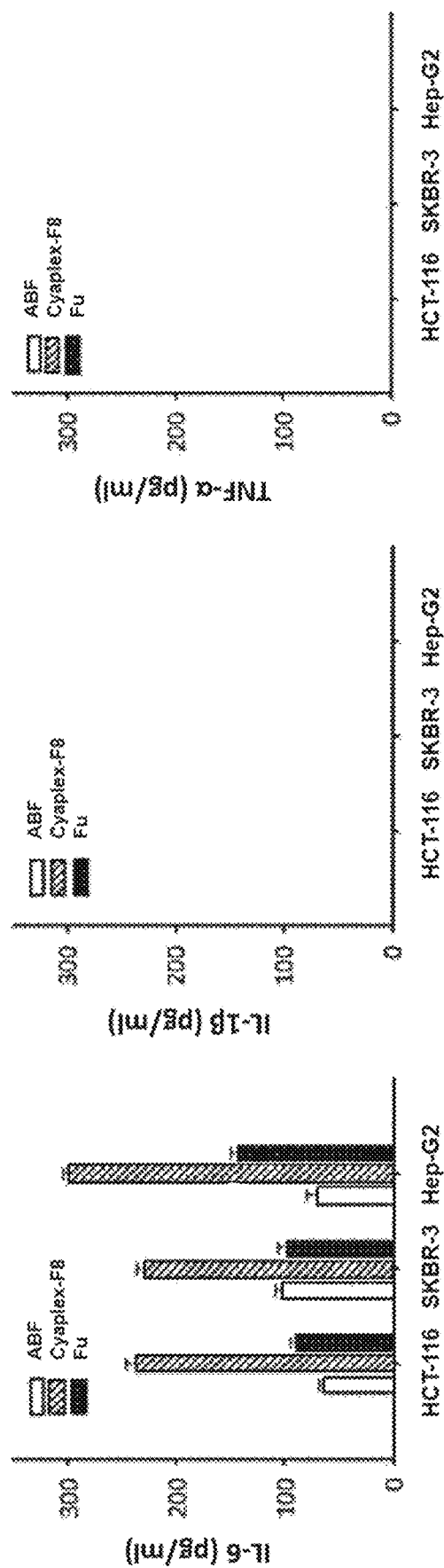
FIG. 6 shows a result of confirming the level of immune induction through the secretion of immune factors of the *aronia* extract-fucoidan complex.

According to an example of the present invention, an *aronia* extract (ABF) solution containing 50 μg/ml of an *aronia* extract (ABF) or a fucoidan solution containing 500 μg/ml of a fucoidan and *aronia* extract-fucoidan complex containing 50 μg/ml of an *aronia* extract (ABF) and 500 μg/ml of fucoidan was treated to HCT-116 (human colon cells), SKBR-3 (human breast cancer cells) and Hep-G2 (human liver cells), respectively and as a result, as shown in FIG. 6, it was confirmed that IL-6 was secreted higher when the *aronia* extract-fucoidan complex was treated than when the *aronia* extract (ABF) and fucoidan were treated alone, and in the cells treated with the *aronia* extract (ABF) and fucoidan, and the amount of IL-6 secreted from the cells treated with the *aronia* extract-fucoidan complex was higher than the sum of the amount of IL-6 secreted from the cells treated with the *aronia* extract (ABF) and the fucoidan.

From the results, it was confirmed that the *aronia* extract-fucoidan complex can induce the expression of immune factors in vivo, thereby increasing the activity of immune cells.

Accordingly, the present invention may provide an immune anticancer drug comprising an *aronia* extract-fucoidan complex composed with an *aronia* extract and a fucoidan, wherein an ionic bond is formed between a cation of a cyanidine of the *aronia* extract and an anion of the fucoidan, and π-π bonds are formed between the cyanidine molecules, as an active ingredient.

The *aronia* extract-fucoidan complex may induce an expression of immune factors to increase an activity of immune cells and to kill cancer cells.

The cancer cells may be cancer cells of solid cancers, and more specifically, the solid cancer may be selected from the group consisting of colon cancer, breast cancer, lung cancer, stomach cancer, epithelial ovarian cancer, brain cancer, skin cancer and liver cancer, but it is not limited thereto.

Figure 5:
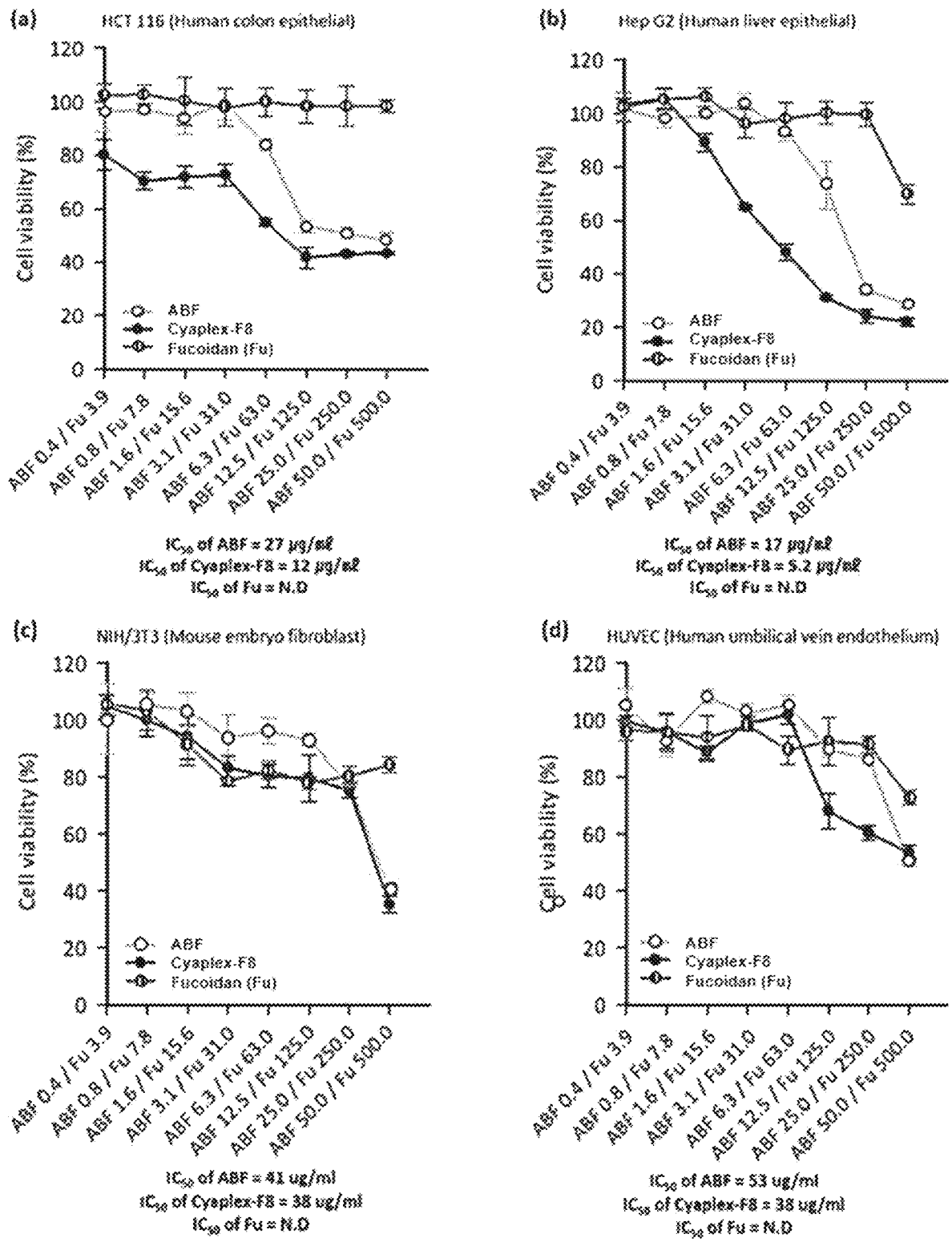
FIG. 5 shows a result of confirming the anticancer efficacy of the *aronia* extract-fucoidan complex and the killing rate for normal cells, the result of confirming the $IC_{50}$ according to the content of *aronia* extract-fucoidan in (a) HCT-116, (b) Hep-G2, (c) NIH/3T3 and (d) HUVEC.

According to another example of the present invention, in order to confirm the anticancer effect against cancer cells and toxicity to normal tissue cells of complex with anthocyanins, each eight samples were prepared by the serial dilution method to dilute ½ from initial concentration using an *aronia* extract (ABF) solution containing 50 μg/ml of an *aronia* extract (ABF) or a fucoidan solution containing 200 μg/ml of fucoidan and a *aronia* extract-fucoidan complex containing 50 μg/ml of *aronia* extract (ABF) and a 200 μg/ml of fucoidan and they were treated to HCT-116 (human colon cells), NIH/3T3 (rat embryonic fibroblasts), HUVEC (endothelial cells; ATCC) and Hep-G2 (human liver). Cells) to confirm the cancer cell killing level of the sample, respectively, as shown in FIG. 5, it was confirmed that the $IC_{50}$ values of the *aronia* extract (ABF) solution for the HCT-116 and Hep-G2 were 27 μg/ml and 17 μg/ml, respectively and the $IC_{50}$ values of the *aronia* extract-fucoidan complex were 12 μg/ml and 5.2 μg/ml. In addition, in normal tissue cells NIH/3T3 and HUVEC, $IC_{50}$ values for the *aronia* extract (ABF) solutions were 41 μg/ml and 53 μg/ml, respectively, and $IC_{50}$ values for the *aronia* extract-fucoidan complex were 38 μg/ml and 38 μg/ml.

From the above results, as the $IC_{50}$ value of the *aronia* extract-fucoidan complex for cancer cells was lower than that of the *aronia* extract (ABF) solution, it was confirmed that the *aronia* extract-fucoidan complex effectively killed cancer cells in a smaller amount than the *aronia* extract (ABF). As the $IC_{50}$ value of the *aronia* extract-fucoidan complex for normal tissue cells was higher than that of cancer cells, it was confirmed that the *aronia* extract-fucoidan complex could effectively kill cancer cells without cytotoxicity to normal cells.

In one embodiment of the present invention, the pharmaceutical composition for preventing or treating cancer disease comprising the *aronia* extract-fucoidan complex as an active ingredient can be used as any one formulation selected from the group consisting of injection, granule, powder, tablet, pill, capsule, suppository, gel, suspensions, emulsions, drops or liquids according to a conventional method.

In another embodiment of the present invention, a pharmaceutical composition for preventing or treating cancer disease comprising *aronia* extract-fucoidan complex as an active ingredient may further include one or more suitable additives selected from the group consisting of carriers, excipients, disintegrants, sweeteners, coating agents, swelling agents, slip modifiers, flavoring agents, antioxidants, buffers, bacteriostatic agents, diluents, dispersants, surfactants, binders and lubricants, which are commonly used in the manufacture of pharmaceutical compositions Specifically, carriers, excipients or diluents include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinylpyrrolidone, water, methylhydroxybenzoate, propylhydroxybenzoate, talc, magnesium stearate, mineral oil and the like. Solid preparations for oral administration include tablets, pills, powders, granules, capsules, etc. and these solid preparations can be prepared by mixing at least one excipient such as starch, calcium carbonate, sucrose or lactose, gelatin, etc. in the composition. Further, in addition to simple excipients, lubricants such as magnesium stearate, talc are also used. Oral liquid preparations include suspensions, oral solutions, emulsions, and syrups, and may include various excipients such as wetting agents, sweeteners, fragrances, preservatives and the like in addition to commonly used simple diluents such as water and liquid paraffin. Formulations for parenteral administration include sterile aqueous solutions, non-aqueous solvents, suspensions, emulsions, freeze drying agents, suppositories. As the non-aqueous solvents and suspensions, propylene glycol, polyethylene glycol, vegetable oils such as olive oil, injectable esters such as ethyl oleate, and the like may be used. As the base of the suppository, witepsol, macrogol, tween 61, cacao butter, laurinum, glycerogelatin and the like may be used.

According to an example of the present invention, the pharmaceutical composition can be administered to a subject in a conventional manner through intravenous, intraarterial, intraperitoneal, intramuscular, intraperitoneal, intrasternal, transdermal, intranasal, inhalation, topical, rectal, oral, intraocular or intradermal routes.

The preferred dosage of the *aronia* extract-fucoidan complex may vary depending on the condition and weight of the subject, the type and extent of the disease, the drug form, the route and duration of administration, and may be appropriately selected by those skilled in the art. According to one example of the present invention, it is not limited thereto, but the daily dosage may be 0.01 to 200 mg/kg, specifically 0.1 to 200 mg/kg, and more specifically 0.1 to 100 mg/kg.

The administration may be administered once a day or divided into several administrations, and the scope of the present invention is not limited thereby.

In the present invention, the 'subject' may be a mammal, including a human, but it is not limited to these examples.

In addition, the present invention may provide a health food for anticancer comprising an *aronia* extract-fucoidan complex composed with an *aronia* extract and a fucoidan, wherein an ionic bond is formed between a cation of a cyanidine of the *aronia* extract and an anion of the fucoidan, and π-π bonds are formed between the cyanidine molecules, as an active ingredient.

The above health food may be used with other foods or food additives other than the *aronia* extract-fucoidan complex, and may be appropriately used according to a conventional method. The mixing amount of the active ingredient may be appropriately determined according to its purpose of use, for example, prevention, health or therapeutic treatment.

The effective dose of the compound contained in the health functional food may be used in accordance with the effective dose of the therapeutic agent. However, in the case of long-term intake for the health and hygiene or for health control purposes, it may be used in the above range or lower, and it is clear that the active ingredient can be used in an amount of at least the above range because there is no problem in terms of safety.

There is no particular limitation regarding the kind of the health functional food. Examples of the health functional food include meat, sausage, bread, chocolate, candy, snack, confectionery, pizza, ramen, other noodles, gums, dairy products including ice cream, various soups, beverages, tea, drinks, alcoholic beverages and vitamins complex, etc.

In addition, the present invention may provide an anticancer adjuvant comprising an *aronia* extract-fucoidan complex composed with an *aronia* extract and a fucoidan, wherein an ionic bond is formed between a cation of a cyanidine of the *aronia* extract and an anion of the fucoidan, and π-π bonds are formed between the cyanidine molecules, as an active ingredient.

The anticancer adjuvant may relieve side effects caused by administration of an anticancer agent, and the side effects caused by administration of the anticancer agent may be selected from the group consisting of weight loss, immune factor reduction and cachexia.

Hereinafter, examples of the present invention will be described in detail to understand the present invention. The present invention may, however, be embodied in many different forms and should not be limited to the embodiments set forth herein in order to clearly illustrate the present invention for those skilled in the art to which the present invention pertains.

<Example 1> Preparation of *Aronia* Extract-Fucoidan Complex 20 mg of *aronia* extract (ABF) [JBK Lab.] was dissolved in 20 ml of an aqueous solution of phosphate buffer pH 3 (PB 3) so that no precipitate was visible and 200 mg of fucoidan (Haewon Biotech) was dissolved in 20 ml of distilled water so that no precipitate was visible and then a *aronia* extract solution was added to the fucoidan solution and stirred at room temperature for 72 hours to prepare a *aronia* extract-fucoidan complex (Cyaplex-F8).

On the other hand, the *aronia* extract (ABF) and the fucoidan were dissolved in the same amount used to prepare the complex and used as a comparative example.

<Example 2> Confirmation of *Aronia* Extract-Fucoidan Complex Properties

1. Confirmation of *Aronia* Extract-Fucoidan Complex Formation

From the first day to the sixth day, samples of an *aronia* extract (ABF) solution and a *aronia* extract-fucoidan complex were obtained, and after diluting the samples to ¹⁄₁₀, the optical density was measured by a spectrophotometer (UV-1601, Shimadzu, JAPAN). In addition, an optical photograph was obtained with an *aronia* extract (ABF) solution and a *aronia* extract-fucoidan complex stock solution.

Figure 1:
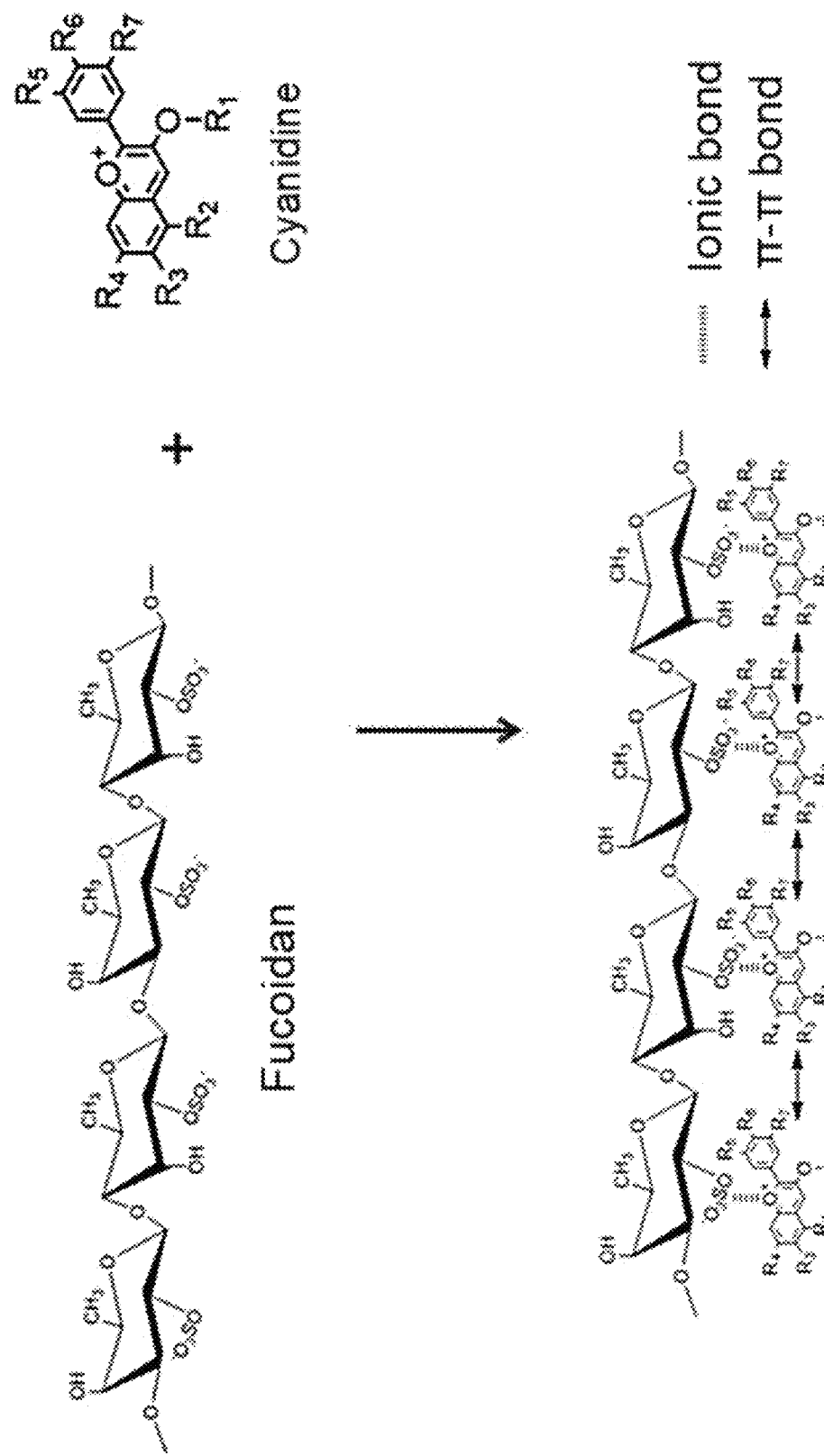
FIG. 1 shows a structure of a complex by cyanidine-fucoidan bond (Cyaplex-F8).
Figure 2:
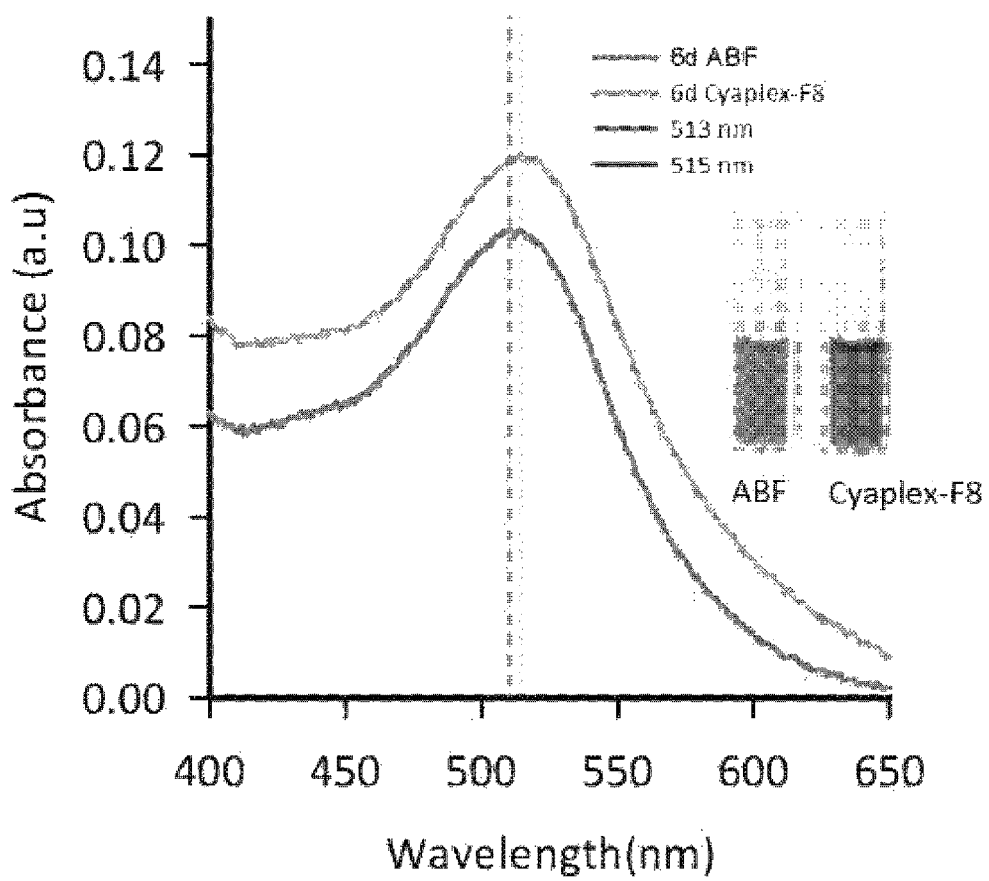
FIG. 2 shows a result of confirming an absorbance and an optical image of the *aronia* extract-fucoidan complex.

As a result, as shown in FIG. 2, the *aronia* extract-fucoidan complex was formed by ionic bond formed by cationic property of the cyanidine of an *aronia* extract and anionic property of the fucoidan, and it was also found that π-π interactions between cyanidine molecules also contribute to the formation of the complex. In addition, it was confirmed that the maximum absorbance of cyanidine possessed by π-π interaction while *aronia* extract-fucoidan formed a complex is red-shifted as shown in FIG. 2, and it was confirmed from the optical photograph that the complex-formed sample had a purple color than the *aronia* extract (ABF) solution.

2. Confirmation of *Aronia* Extract-Fucoidan Complex Size

After placing 2 ml of the completed complex into a polystyrene cuvette (DTS0012), the size of the complex was confirmed using a zeta potential & nanoparticle size analyzer (Zetasizer nano ZS, Malvern Instruments Ltd., England). In addition, 10 μl of the completed complex was placed on a cover glass and dried in an oven at 60° C. overnight to obtain an image with a scanning electron microscope (S-4800, HITACHI, Ltd., U.S.A).

Figure 3:
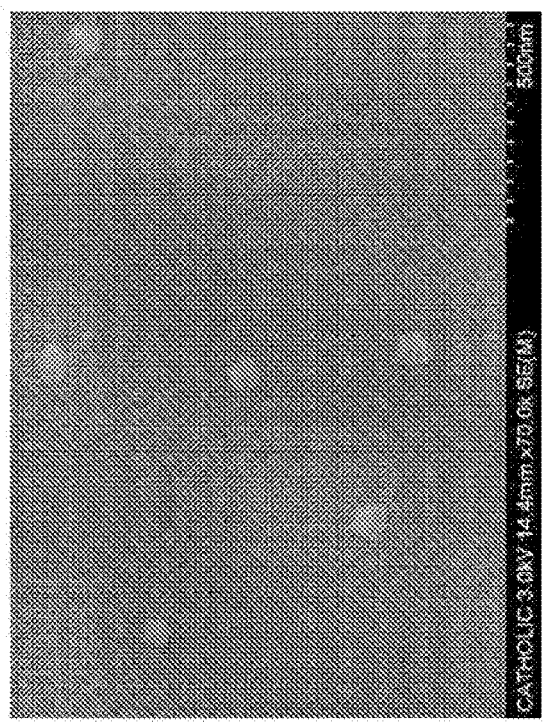
FIG. 3 shows DLS result of the *aronia* extract-fucoidan complex (left) and a scanning electron microscope analysis result of the *aronia* extract-fucoidan complex.
Figure 3:
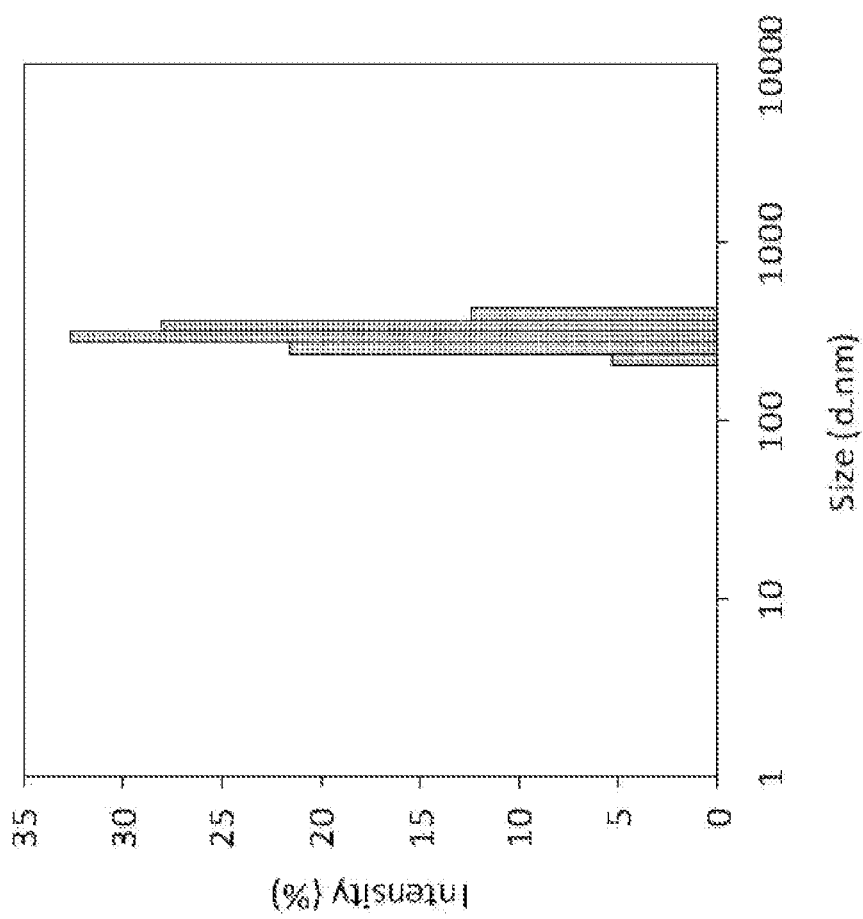

Referring to the photo on the left of FIG. 3, which is a result of the zeta potential & nanoparticle size analyzer analysis, the complex was confirmed to be about 380 nm in nano size. In addition, the size of the scanning electron microscope image, which is a picture on the right in FIG. 3, was confirmed to be about 85 nm.

3. Confirmation of Structural Stability Improving Effect of Complex Under Various pH Conditions After centrifuging 40 ml of the complex obtained by the method for preparing the *aronia* extract-fucoidan complex for 13000 rpm for 30 minutes, supernatant was removed and the remaining precipitate was re-dispersed with PB 3 (pH 3) and phosphate buffer saline (pH 7) and the effect of improving structural stability was confirmed by measuring with anthocyanin solution with a spectrophotometer over time.

Figure 4:
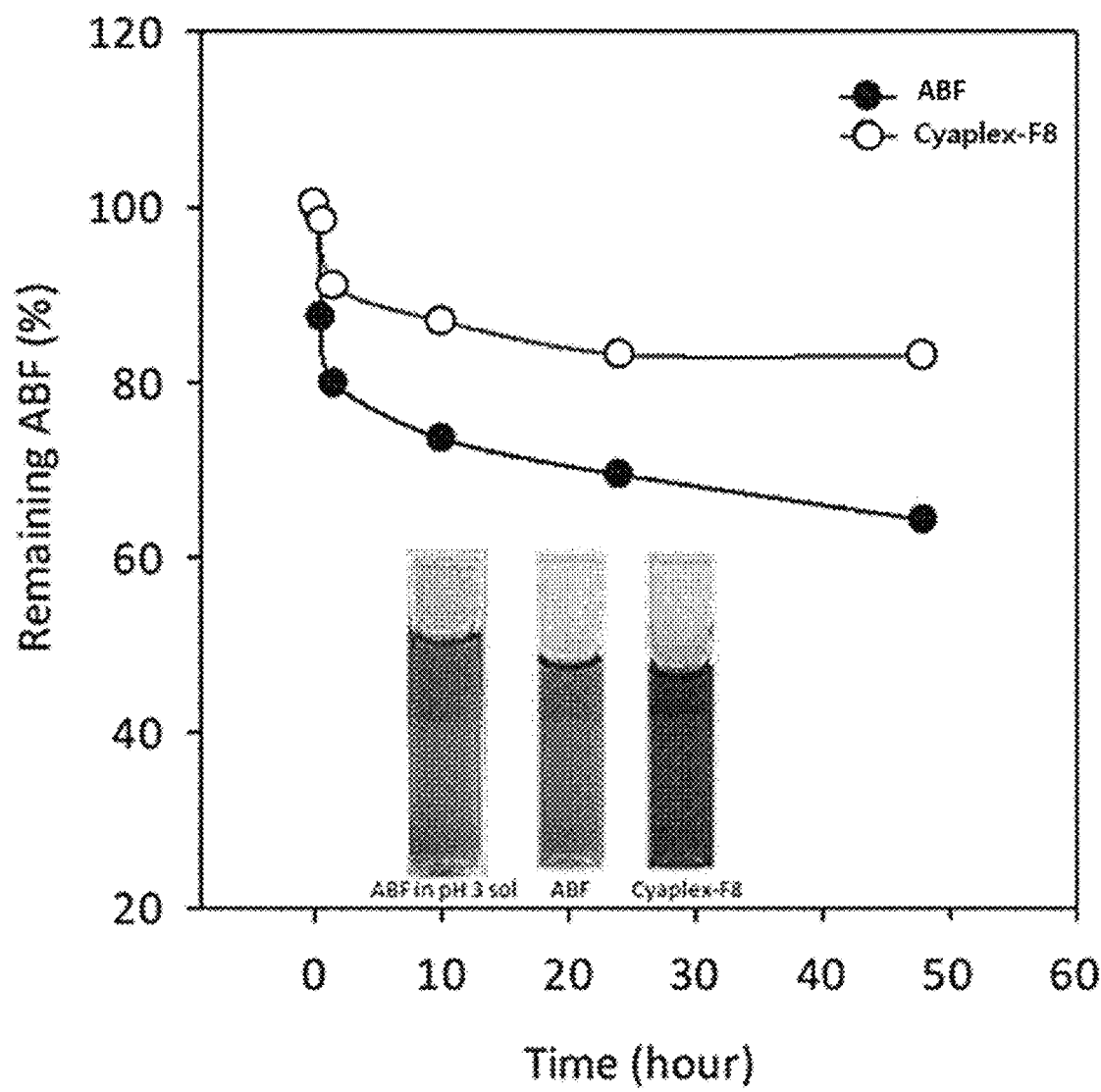
FIG. 4 shows a result of confirming the difference in the degree of degradation of *aronia* extract in an *aronia* extract and the *aronia* extract-fucoidan complex.

As a result, as shown in FIG. 4, the *aronia* extract (ABF) is stable in a low pH environment (pH 3), and decomposition occurs as the pH increases.

In more detail, if the *aronia* extract (ABF) is treated in human body, it will be exposed to pH 7.4 of the human body, and eventually decomposition may be expected and indeed, as shown in FIG. 4, anthocyanin was decomposed with time, but it was confirmed that the *aronia* extract-fucoidan complex maintains the absorbance value to a certain degree over time.

From the above results, it was confirmed that the *aronia* extract-fucoidan complex exhibits excellent stability even in acidic conditions in vivo.

<Example 3> Confirmation of In Vitro Cytotoxicity and Cytokine Secretion of *Aronia* Extract-Fucoidan Complex 1. Confirmation of In Vitro Cytotoxicity of *Aronia* Extract-Fucoidan Nanoparticles The anticancer effect of complex of *aronia* extract and fucoidan against cancer cells and toxicity to normal tissue cells were confirmed.

First, an *aronia* extract (ABF) solution containing 50 µg/ml *aronia* extract (ABF) or a fucoidan solution containing 200 µg/ml fucoidan and sample of *aronia* extract-fucoidan complex containing 50 µg/ml *aronia* extract (ABF) and 200 µg/ml fucoidan were prepared, and each 8 samples for the remaining samples were prepared using a serial dilution method diluting to ½ from the aforementioned initial concentration.

Experimental cells HCT-116 (human colon cell carcinoma; Korea Cell Line Bank) and HUVEC (endothelial cells; ATCC) were cultured in RPMI 1640 (Wellgene) medium containing penicillin and streptomycin and 10% FBS, and Hep-G2 (Human liver cell carcinoma; Korean cell line bank) and NIH/3T3 (rat embryonic fibroblasts; Korean cell line bank) were cultured in DMEM medium containing penicillin and streptomycin.

The cell lines were seeded at $5 \times 10^4$ cells per well on 24-well plates and cultured overnight. Thereafter, the cells were incubated with DMEM- and FBS-free RPMI and samples of various concentrations at 37° C. for 24 hours, followed by exposing to FBS-added DMEM, RPMI medium and 10% cell counting kit-8 (CCK-8) solution (CCK-8 kit, Enzo Life Sciences, Inc., KOREA) and incubating at 37° C. for 4 hours to confirm cytotoxicity at an optical density of 450 nm.

As a result, as shown in FIG. 5, $IC_{50}$ values for *aronia* extract (ABF) solutions of the HCT-116 and Hep-G2 were 27 µg/ml and 17 µg/ml, respectively, and $IC_{50}$ values for the *aronia* extract-fucoidan complex was confirmed to be 12 µg/ml and 5.2 µg/ml. In addition, in normal tissue cells NIH/3T3 and HUVEC, $IC_{50}$ values for *aronia* extract (ABF) solutions were 41 µg/ml and 53 µg/ml, respectively, and $IC_{50}$ values for *aronia* extract-fucoidan complex were 38 µg/ml and 38 µg/ml.

From the above results, it was confirmed that the $IC_{50}$ value of the *aronia* extract-fucoidan complex for cancer cells was lower than that of the *aronia* extract (ABF) solution, and the complex effectively killed cancer cells in a smaller amount than the *aronia* extract (ABF) solution alone. In addition, it was confirmed that as the $IC_{50}$ value of the *aronia* extract-fucoidan complex for normal tissue cells was higher than that of the cancer cells, the *aronia* extract-fucoidan complex had a higher anticancer effect than when the *aronia* extract (ABF) solution was used alone and cytotoxicity to normal tissue cells was low.

2. Confirmation of Cytokine Secreted from Cells Killed by *Aronia* Extract-Fucoidan Nanoparticles An *aronia* extract (ABF) solution containing 50 µg/ml *aronia* extract (ABF) or a fucoidan solution containing 500 µg/ml fucoidan and a sample of *aronia* extract-fucoidan complex containing 50 µg/ml *aronia* extract (ABF) and 500 µg/ml fucoidan were prepared.

Experimental cells HCT-116 (human colon cell carcinoma; Korean cell line bank) and SKBR-3 (human breast cancer cell; Korean cell line bank) were cultured in RPMI 1640 (Wellgene) medium containing penicillin and streptomycin and 10% FBS, and Hep-G2 (human liver cell carcinoma; Korea Cell Line Bank) was cultured in DMEM medium containing penicillin and streptomycin.

Each cell line cultured on a 6-well plate was seeded at $3 \times 10^5$ cells per well and cultured overnight. Thereafter, the cells were incubated for 24 hours at 37° C. in 2 ml of DMEM- and FBS-free RPMI medium containing various concentrations of samples and after recovering the culture medium, IL-6, IL-1β and TNF-α cytokine levels were confirmed by ELISA (Enzyme Linked Immunosorbent Assay, Enzo Life Sciences, Inc., KOREA).

As a result, the cytokines of IL-1β and TNF-α were not secreted in all three cell lines, as shown in FIG. 6 and IL-6 was secreted more when treated with the *aronia* extract-fucoidan complex than when the *aronia* extract (ABF) and fucoidan were treated alone. In addition, it was confirmed that the amount of IL-6 secreted from the cells treated with the *aronia* extract-fucoidan complex was higher than the sum of the amount of IL-6 secreted from the cells treated with the *aronia* extract (ABF) and fucoidan alone.

<Example 4> Confirmation of Tumor Inhibition Effect of *Aronia* Extract-Fucoidan Complex The effect of inhibiting carcinogenesis of the *aronia* extract-fucoidan complex was confirmed in experimental animals treated with a carcinogen and a tumor accelerator.

After epilating the back of a Balb/c (n=5) mouse, 200 µL of carcinogen 7,12-dimethylbenz[a]anthracene (DMBA) 200 nmol/acetone 200 µL was applied to the back, and the tumor accelerator 12-O-tetradecanoylphorbol-13-acetate (TPA) 4 µg/acetone 200 µL was treated twice a week for 22 weeks.

The experimental animals were divided into PBS, *Aronia* Bio-active Fractions (ABF), Fucoidan (Fu) and *aronia* extract-fucoidan complex (Cyaplex-F8) experimental groups, and 800 mg/kg of fucoidan (Fu) 200 µl or 100 mg/kg of *aronia* extract (10 mg/mL) 200 µl was orally administered to each experimental group suitably and Cyaplex-F8 (Fu 80 mg, ABF 10 mg/mL) 200 µl was orally administered daily for 22 weeks at Fu 800 mg and ABF 100 mg/kg, and the weight, survival rate and number and area of induced tumor nodules were checked once a week.

Figure 7:
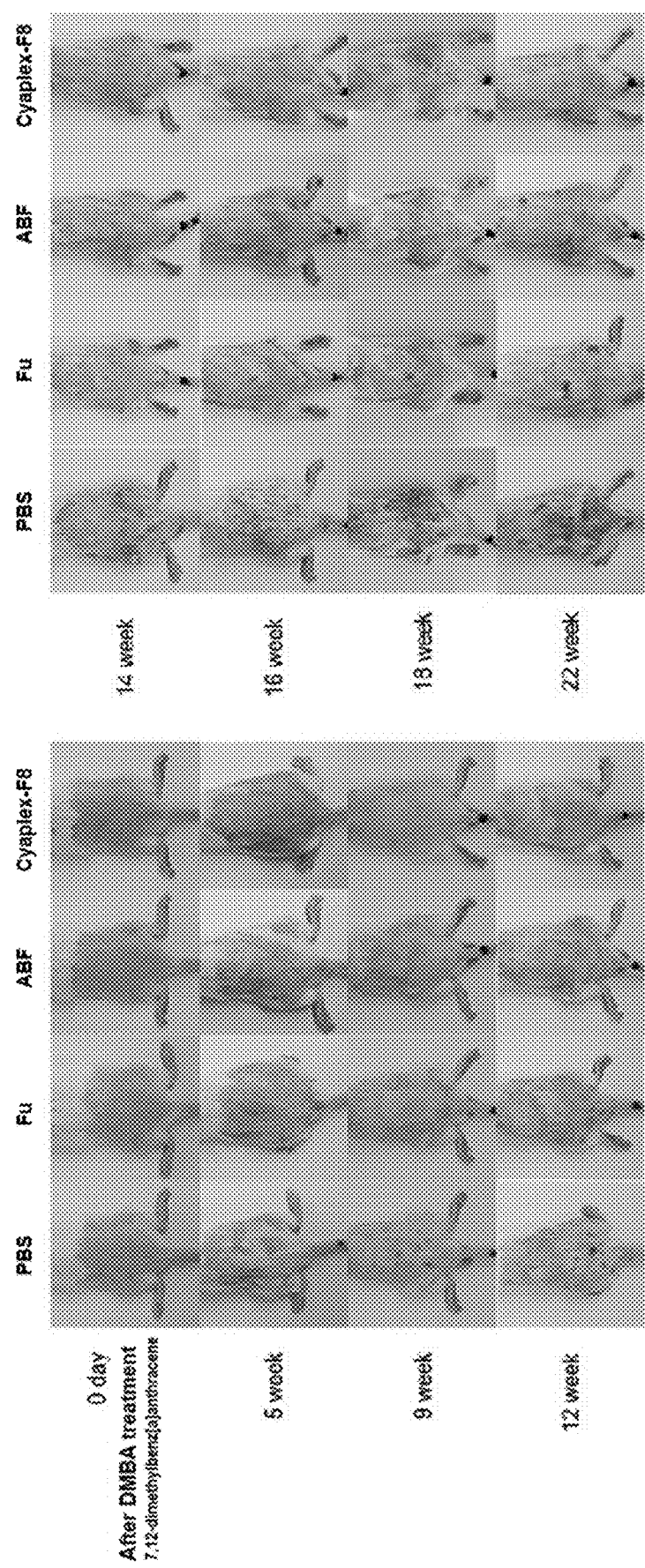
FIG. 7 shows a result of confirming whether or not the tumor was generated in laboratory animals treated with a carcinogen and a tumor accelerator after daily oral administration of PBS, fucoidan (Fu), *aronia* bio-active fractions (ABF) and *aronia* extract-fucoidan complex (Cyaplex-F8) for 22 weeks.
Figure 8:
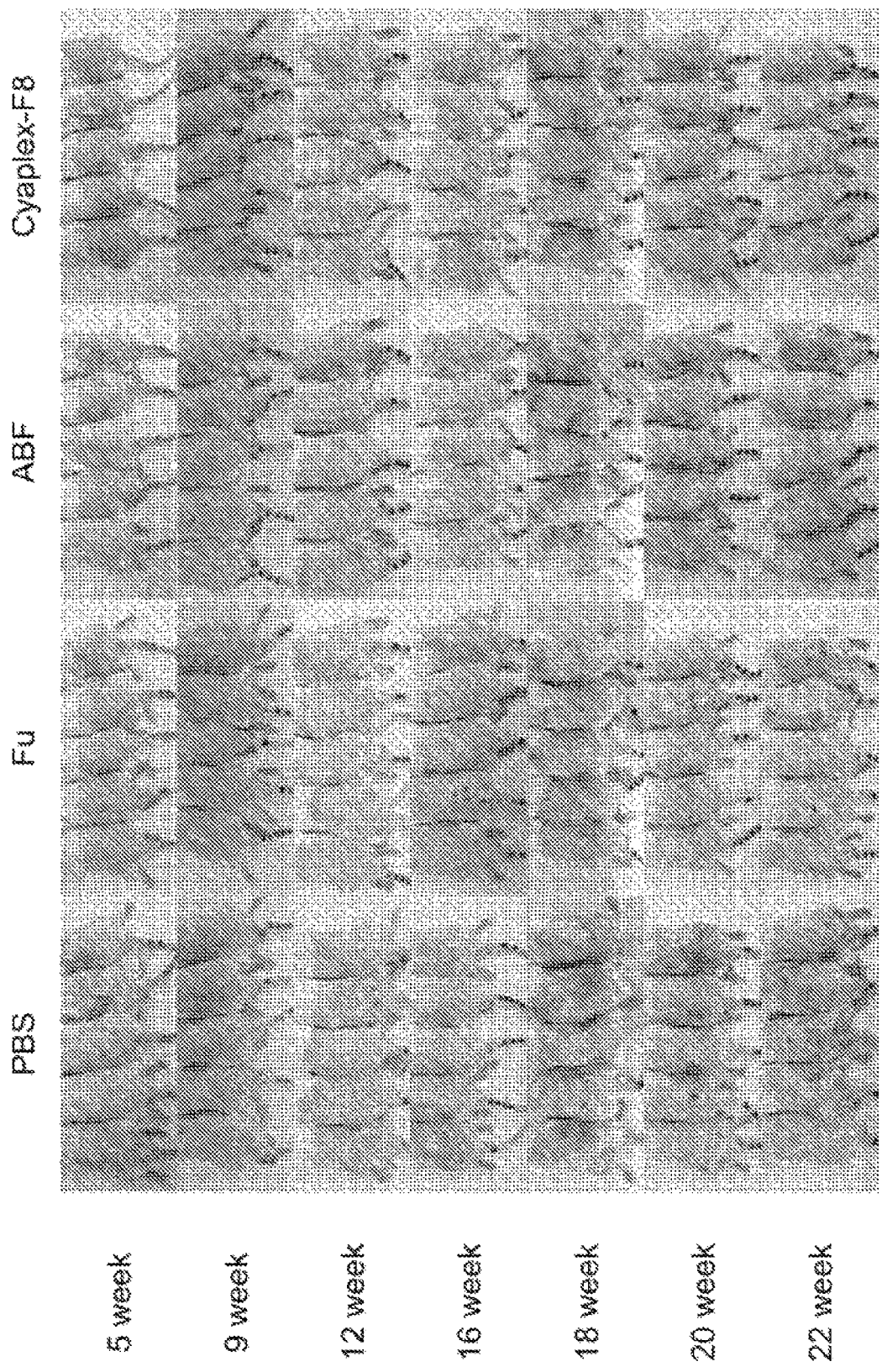
FIG. 8 shows results of confirming the tumor growth inhibitory effect in 5 weeks, 9 weeks, 12 weeks, 16 weeks, 18 weeks, 20 weeks and 22 weeks, in laboratory animals treated with a carcinogen and a tumor accelerator after daily oral administration of PBS, fucoidan (Fu), *aronia* (ABF) and *aronia* extract-fucoidan complex (Cyaplex-F8) for 22 weeks.
Figure 9:
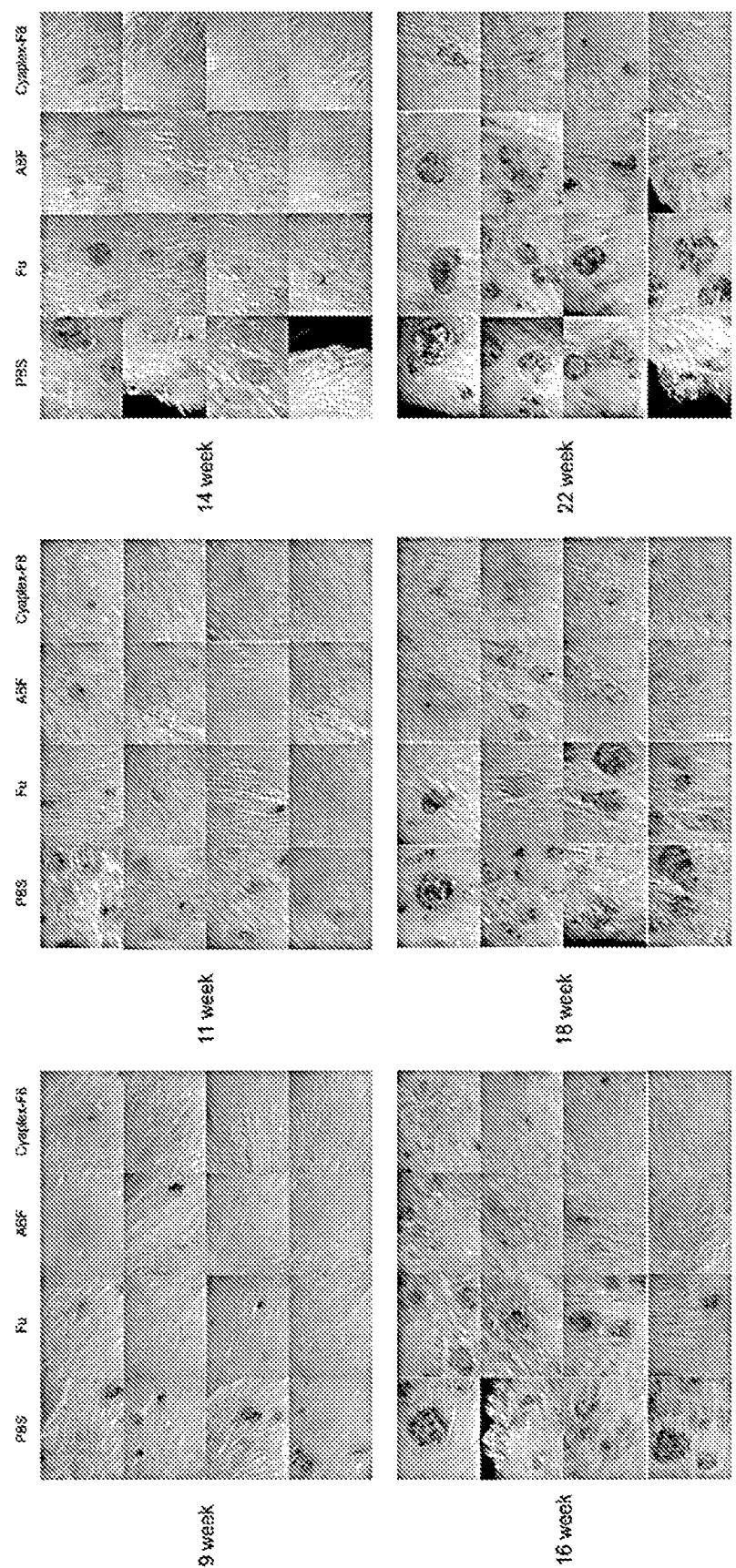
FIG. 9 shows results of confirming the tumor growth inhibitory effect in 9 weeks, 9 weeks, 11 weeks, 14 weeks, 16 weeks, 18 weeks and 22 weeks, in laboratory animals treated with a carcinogen and a tumor accelerator after daily oral administration of PBS, fucoidan (Fu), *aronia* extract (ABF) and *aronia* extract-fucoidan complex (Cyaplex-F8) for 22 weeks.
Figure 10:
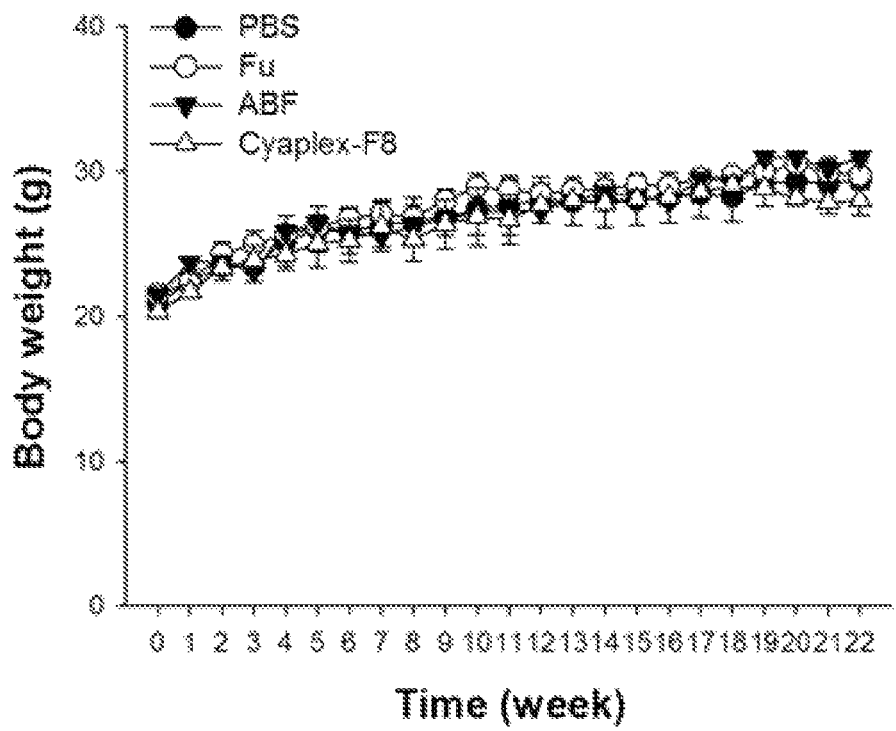
FIG. 10 shows a result of confirming the body weight and the survival rate in laboratory animals treated with a carcinogen and a tumor accelerator after oral administration of PBS, fucoidan (Fu), *aronia* extract (ABF) and *aronia* extract-fucoidan complex (Cyaplex-F8)
Figure 10:
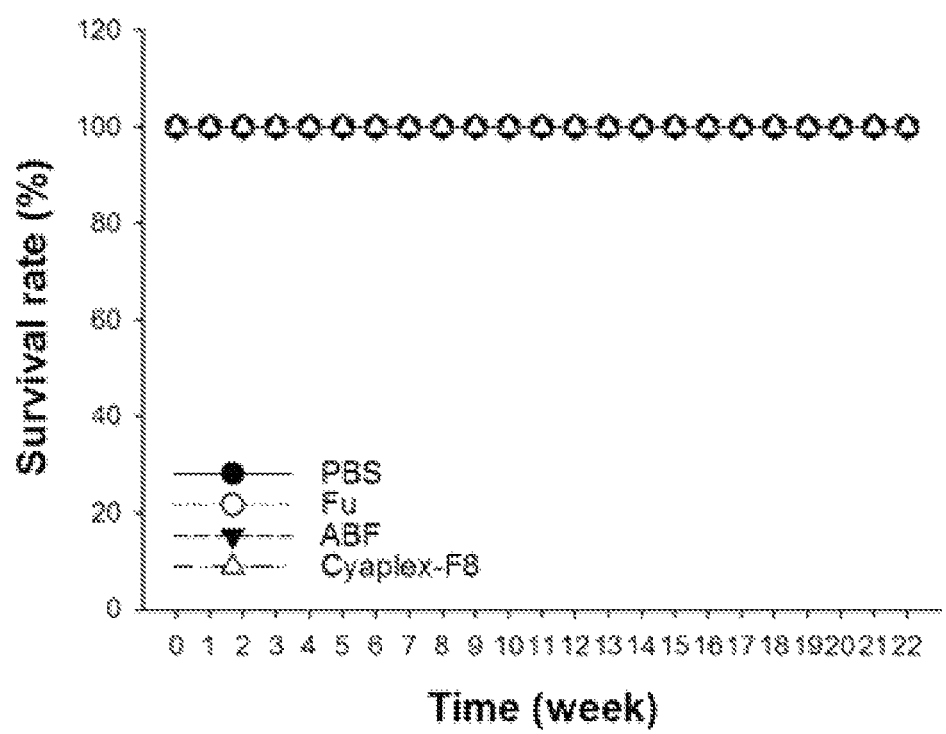
Figure 11:
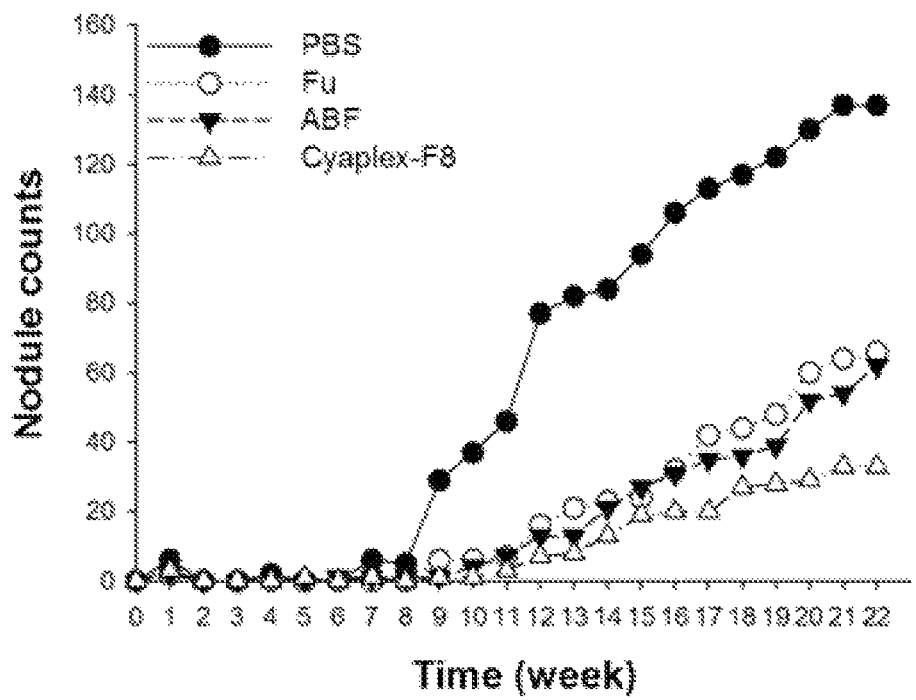
FIG. 11 shows a result of confirming the increase rate of the tumor determination number (Nodule counts) and the tumor area in laboratory animals treated with a carcinogen and a tumor accelerator after oral administration of PBS, fucoidan (Fu), *aronia* extract (ABF) and *aronia* extract-fucoidan complex (Cyaplex-F8).
Figure 11:
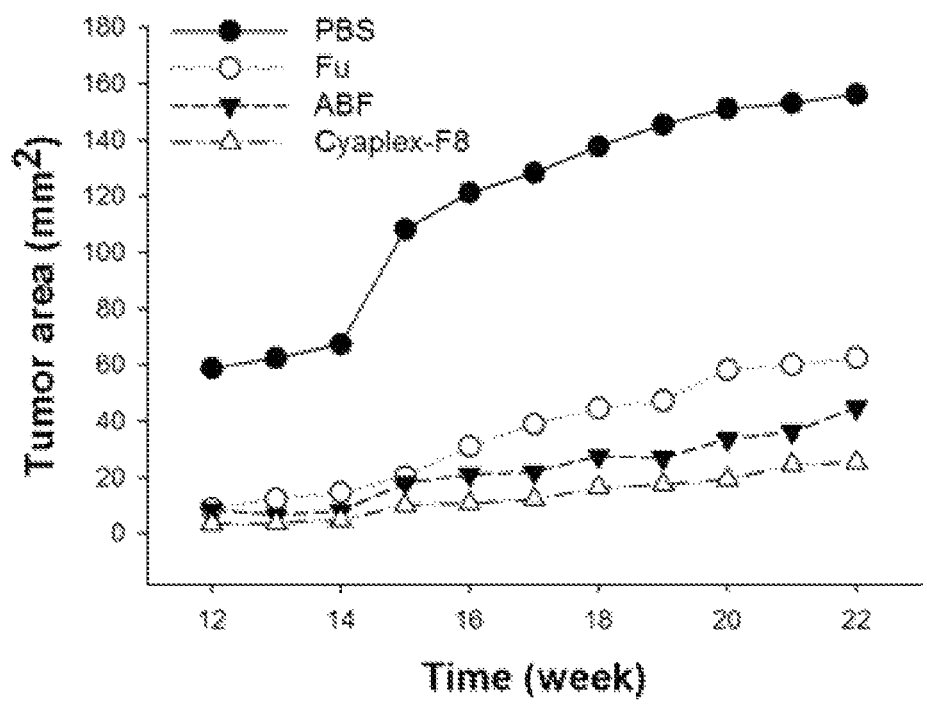

As a result, as shown in FIG. 7 to FIG. 9, tumor nodules appeared from the 9th week in the PBS experimental group, which was applied with carcinogens and tumor accelerators and administered drugs and since then, the number and area of tumors increased, but the effect of inhibiting carcinogenesis was confirmed in the experimental group administered with Fu or ABF, in particular, the Cyaplex-F8 experimental group has excellent carcinogenesis inhibitory efficacy.

In addition, at week 22 of the last week of the experiment, heart, lung, liver and spleen tissues of the main organs of each animal in each experimental group, were extracted and hematoxylin & eosin staining (H&E staining) was performed.

Figure 12:
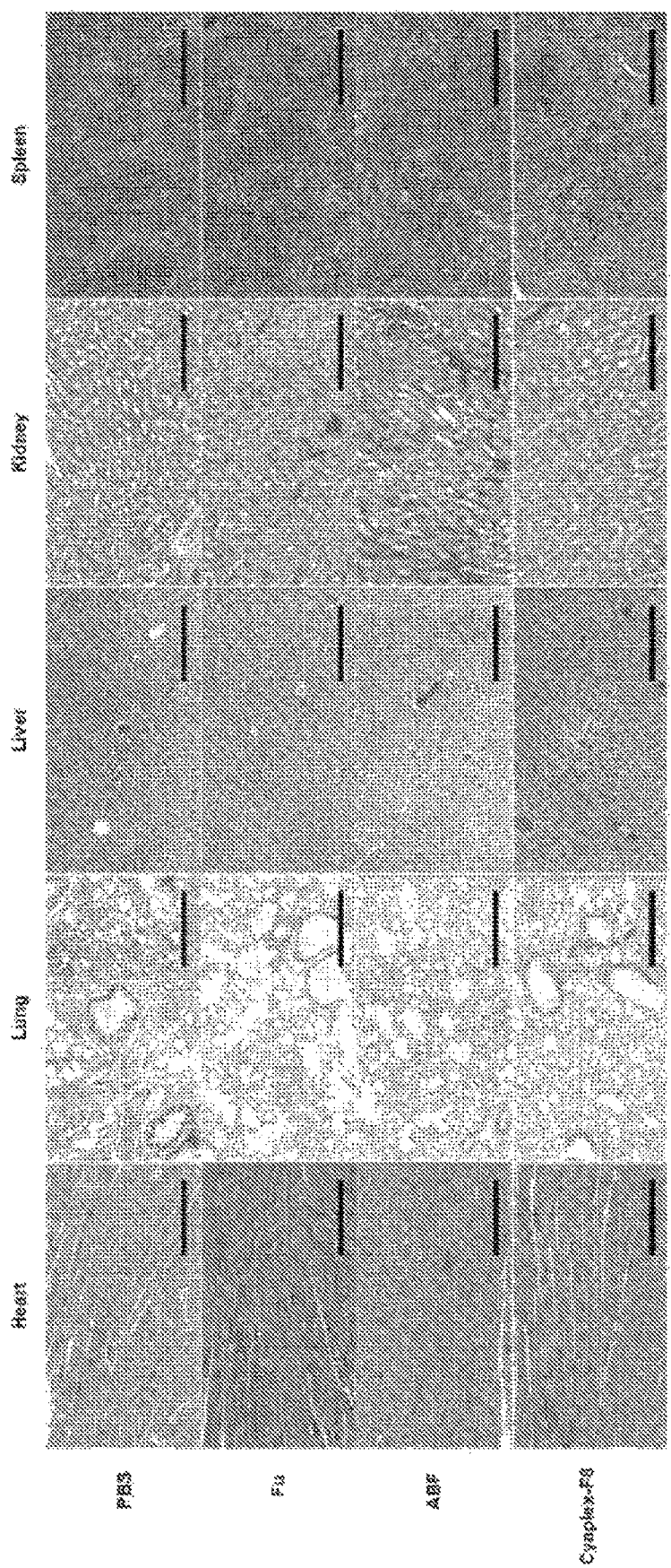
FIG. 12 shows a result of hemotoxin & eosin staining tissues of major organs of heart, lung, liver, kidney and spleen of laboratory animals treated with a carcinogen and a tumor accelerator after oral administration of PBS, fucoidan (Fu), *aronia* extract (ABF) and *aronia* extract-fucoidan complex (Cyaplex-F8).
Figure 13:
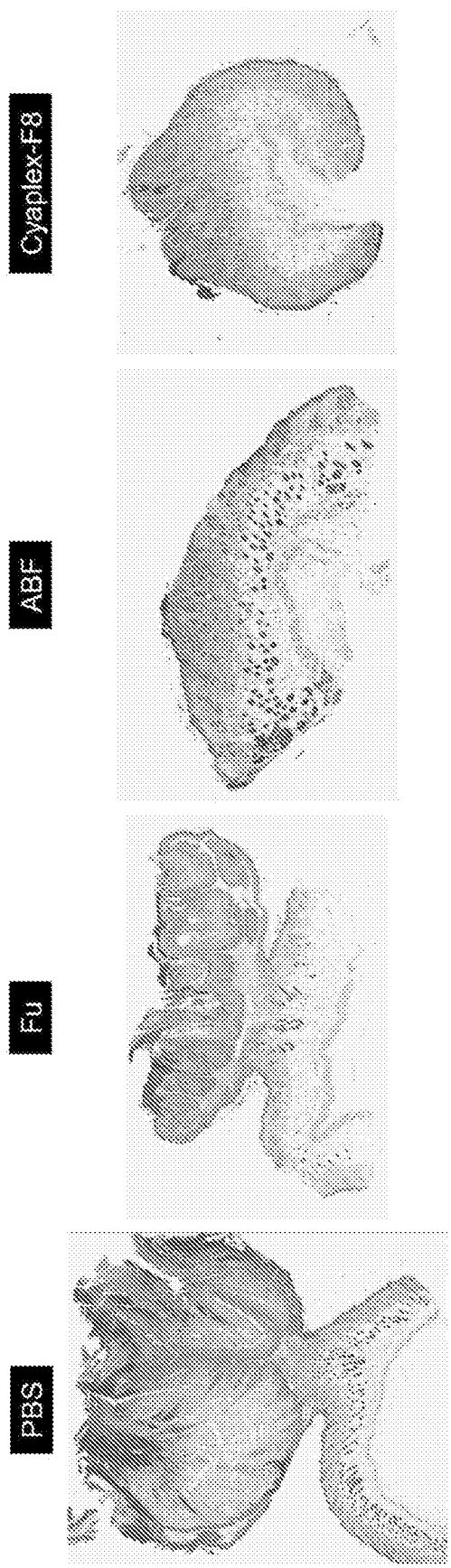
FIG. 13 shows a result of hemotoxin & eosin staining tumor tissues of laboratory animals treated with a carcinogen and a tumor accelerator after oral administration of PBS, fucoidan (Fu), *aronia* extract (ABF) and *aronia* extract-fucoidan complex (Cyaplex-F8).

As a result, as shown in FIG. 12, no specific difference in the major organs for each experimental group was confirmed, but in the case of tumor tissue induced in the back as shown in FIG. 13, it was confirmed that the tumor was induced in the PBS experimental group with the largest area, and the Cyaplex-F8 experimental group had the smallest tumor-induced area.

On the other hand, from the $11^{th}$ week of drug administration, 200 µl of blood from each experimental animal was collected by orbital blood-gathering method and then centrifuged at 13,000 rpm for 10 minutes to separate plasma and IFN-γ present in plasma was quantitatively analyzed by ELISA kit (485-MI-100, R&D Systems, Inc, USA).

Figure 14:
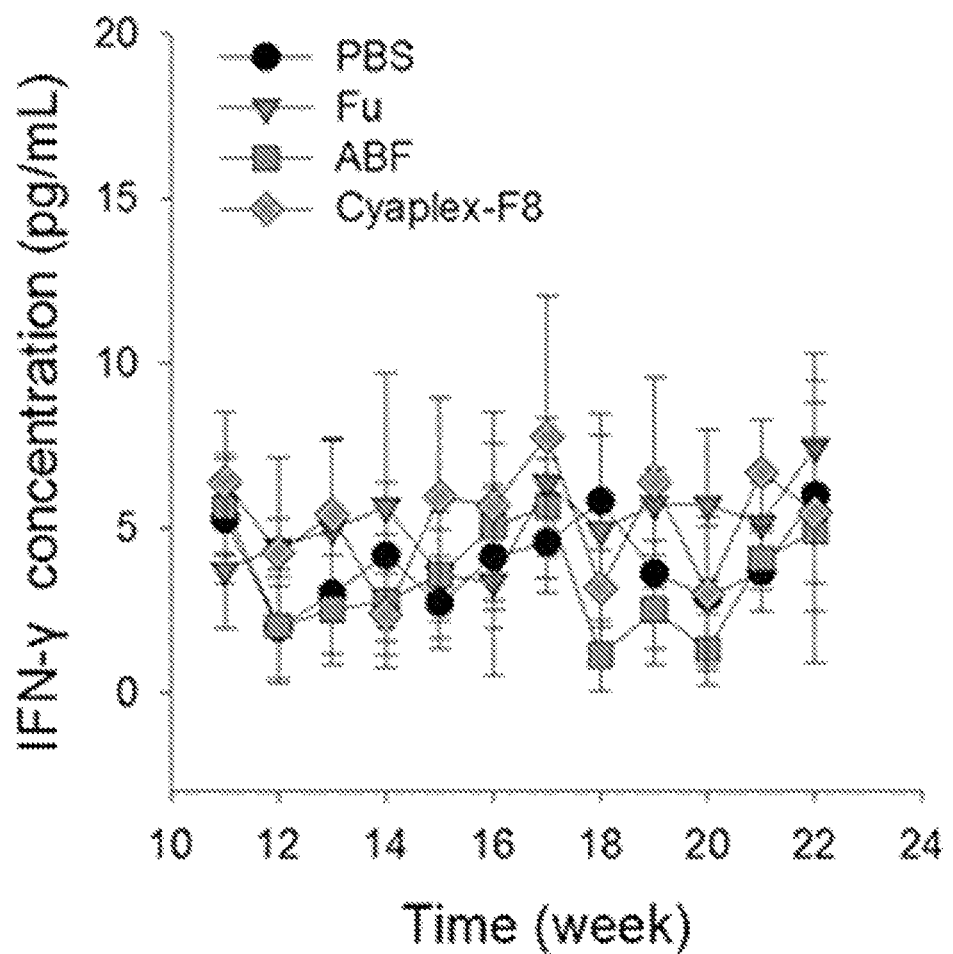
FIG. 14 shows a result of confirming the IFN-γ level in plasma of laboratory animals treated with a carcinogen and a tumor accelerator after oral administration of PBS, fucoidan (Fu), *aronia* extract (ABF) and *aronia* extract-fucoidan complex (Cyaplex-F8).

As a result, as shown in FIG. 14, it was confirmed that the homeostasis of immune function in the body was maintained without significant difference in all the experimental groups from week 11 to week 22.

<Example 5> Confirmation of Combined Administration Effect of *Aronia* Extract-Fucoidan Complex and Anticancer Drug The anticancer effect was confirmed according to the combination administration of a *aronia* extract-fucoidan complex and an anticancer agent.

SK-BR-3 (human breast cancer) was transplanted to Balb/c (n=5) mice at 1×10⁵ cells/mice and 1 week after transplantation, 10 mg/kg of doxorubicin (DOX) was administered intravenously once a week for 2 weeks and for each experimental group except for the doxorubicin administration day, 800 mg/kg of fucoidan (Fu) 200 µl (160 mg/mL) or 100 mg/kg of *aronia* extract (ABF; 20 mg/mL) 200 µl was administered orally, respectively and 200 µl (Fu 160 mg, ABF 20 mg/mL) of Cyaplex-F8 was administered orally for 2 weeks twice a day at Fu 1600 mg and ABF 200 mg/kg.

Figure 15:
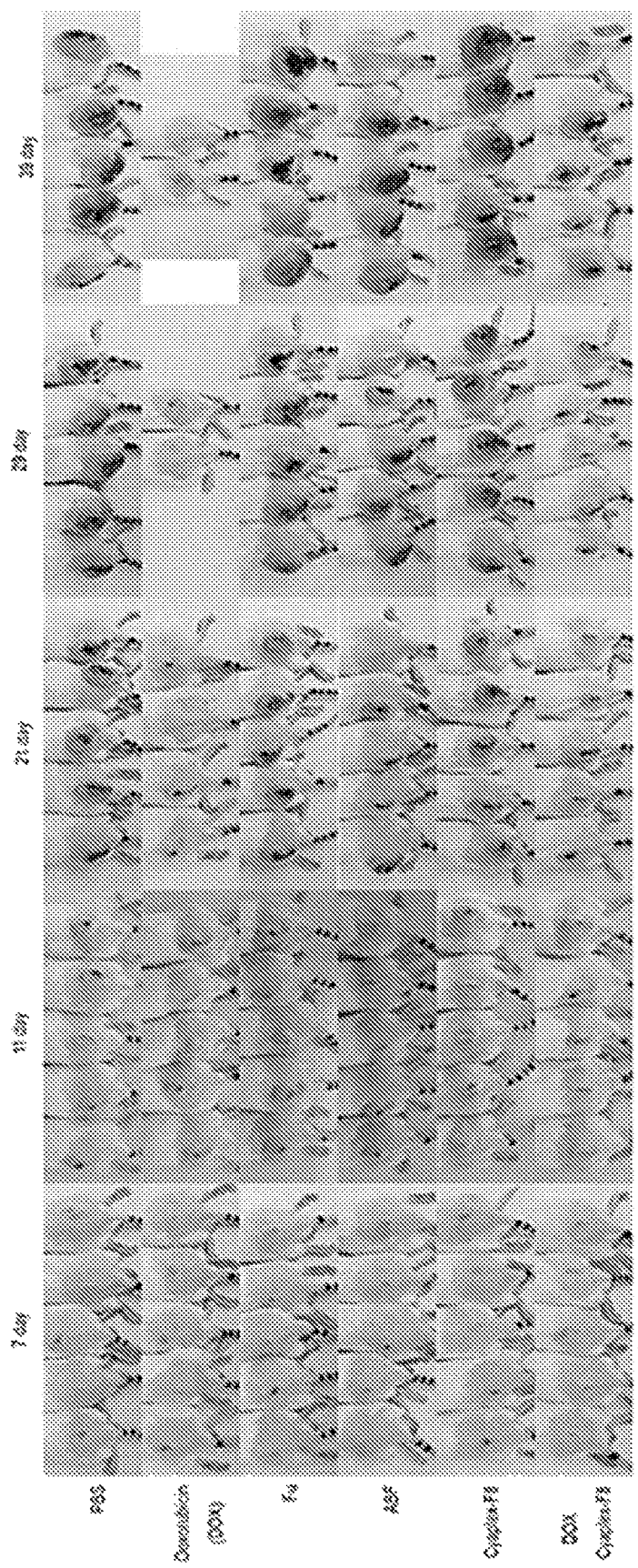
FIG. 15 shows a result of confirming the tumor growth inhibitory effect of a tumor-induced experimental animal by cancer cell transplantation after intravenous injection of doxorubicin followed by oral administration of PBS, fucoidan (Fu), *aronia* extract (ABF) and *aronia* extract-fucoidan complex (Cyaplex-F8).
Figure 16:
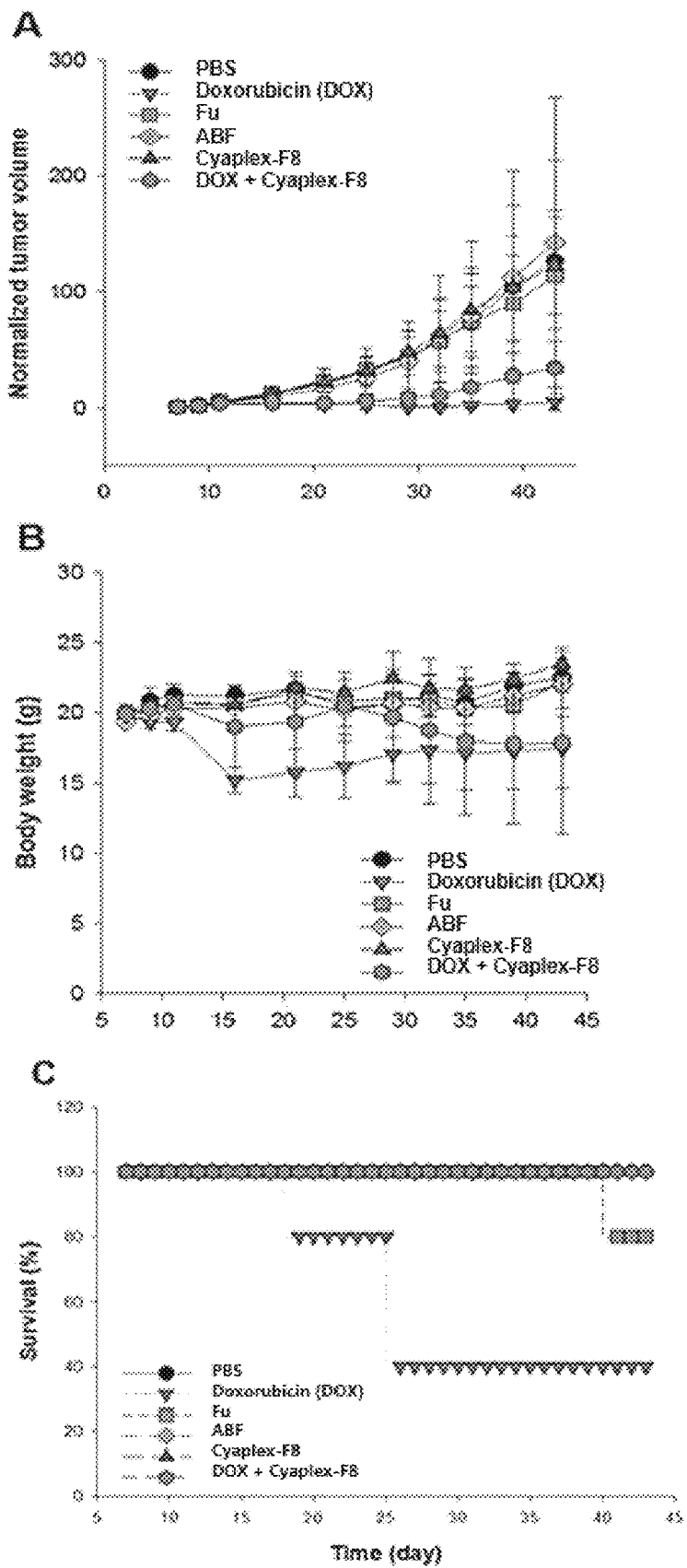
FIG. 16 shows the tumor growth inhibitory effect (A), weight change (B) and survival rate (C) of a tumor-induced experimental animal by cancer cell transplantation after intravenous injection of doxorubicin followed by oral administration of PBS, fucoidan (Fu), *aronia* extract (ABF) and *aronia* extract-fucoidan complex (Cyaplex-F8).

As a result, as shown in FIG. 15 and FIG. 16A, it was confirmed that in the experimental group in which the fucoidan, *aronia* extract (ABF), or the *aronia* extract-fucoidan complex was administered alone, the tumor size increased, but in the experimental group in which the doxorubicin and the *aronia* extract-fucoidan complex Cyaplex-F8 were treated in combination, the tumor size was reduced to a level similar to the experimental group treated with doxorubicin alone.

In addition, referring to FIG. 16B and FIG. 16C, in the experimental group treated with doxorubicin alone, a rapid decrease in body weight of the experimental animals was observed after the second intravenous administration of doxorubicin, but in the experimental group treated with doxorubicin and Cyaplex-F8 in combination, it was found that the weight loss rate was small and the survival life was extended longer than the doxorubicin-treated group, compared with the group treated with doxorubicin alone.

In addition, it was confirmed that in the case of the group administered with doxorubicin alone, while the leukocyte level was $6.57 \times 10^3$ cells/µL, as shown in Table 1, the DOX+Cyaplex-F8 combination administration group increased to $9.54 \times 10^3$ cells/µL.

10-fold with DPBS, centrifuged for 1,500 rpm for 3 minutes, and then the level of cytotoxic T cells in the blood was checked using anti-CD3 and anti-CD8, and flow cytometry of NK cells in the blood was performed using anti-CD49b (DX5).

In addition, the spleens of the experimental animals were extracted on the 14$^{th}$ day, the last day of the experiment to measure the spleen/body weight.

Figure 17:
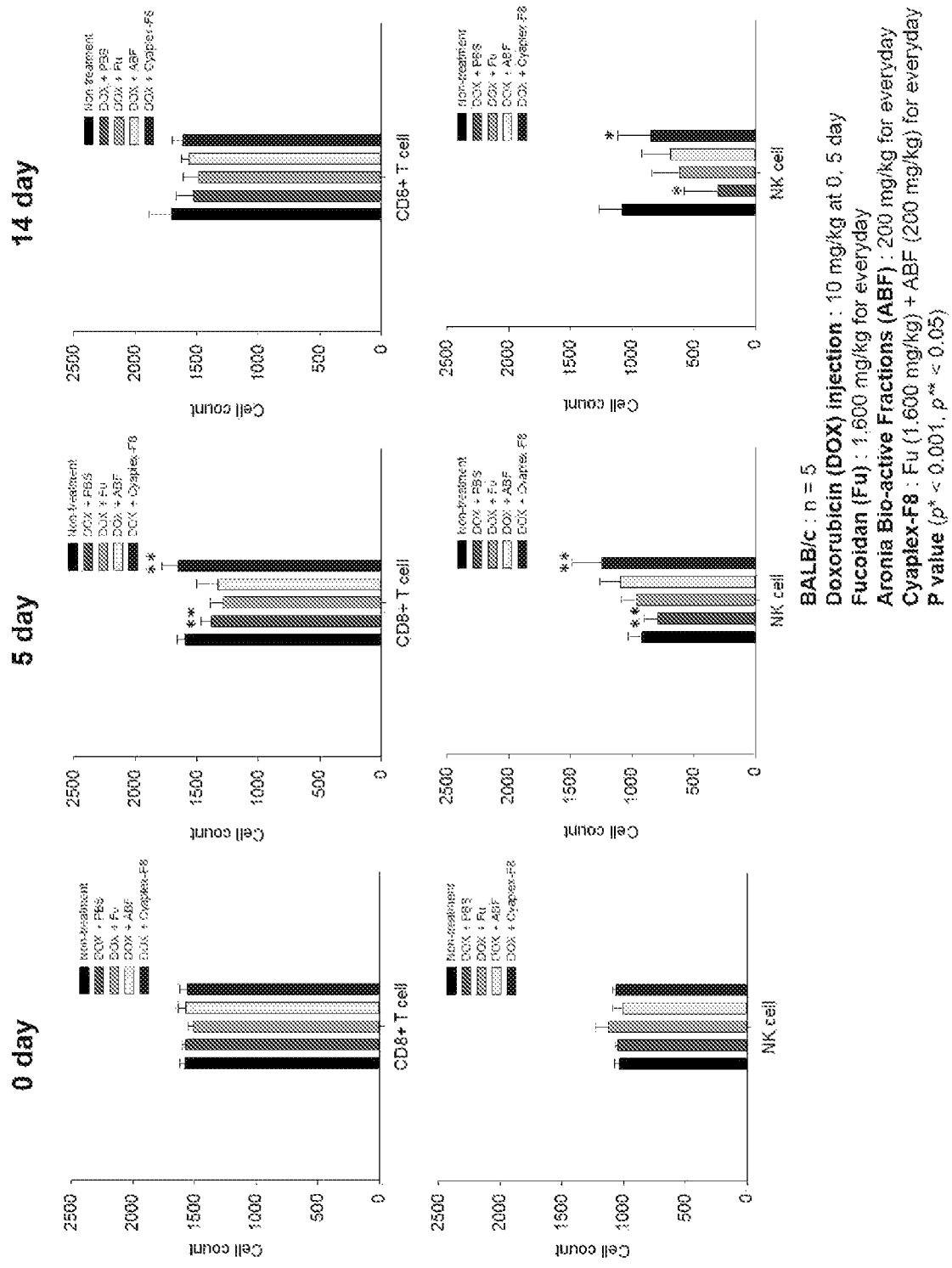
FIG. 17 shows a result of confirming the level of CD8+ T cells and NK cells in the blood on Day 5 and Day 14 of the experiment after intravenous injection of doxorubicin in a mouse animal model on the 1st and 5th day of the experiment (2 times in total) followed by oral administration of PBS, fucoidan (Fu), *aronia* extract (ABF) and *aronia* extract-fucoidan complex (Cyaplex-F8) for 14 days.
Figure 18:
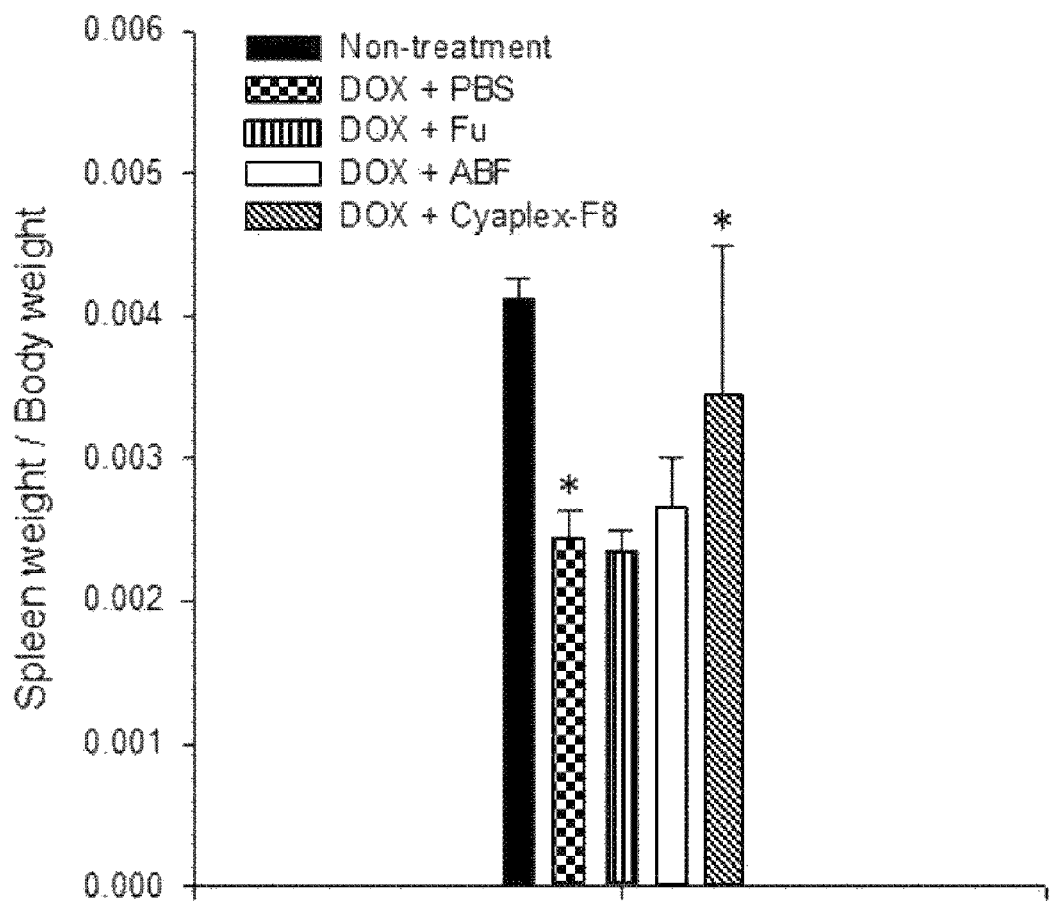
FIG. 18 shows a result of confirming the spleen weight in a mouse animal model after intravenous injection of doxorubicin in the mouse animal model on the 1st and 5th day of the experiment (2 times in total) followed by oral administration of PBS, fucoidan (Fu), *aronia* extract (ABF) and *aronia* extract-fucoidan complex (Cyaplex-F8) for 14 days and extracting the spleen of the animal model on the 14th day of the last day of the experiment.

As a result, as shown in FIG. 17, after administration of doxorubicin, immune cells decreased in all experimental groups, but the experimental group treated with the *aronia* extract-fucoidan complex exhibited superior immune cell (CD8 T cell and NK cell) recovery ability than the experimental group treated with the *aronia* extract (ABF) and fucoidan alone and as shown in FIG. 18, it was confirmed that the reduced body weight was best recovered in the experimental group in which the doxorubicin and the *aronia* extract-fucoidan complex were treated in combination.

From the above results, it was confirmed that the *aronia* extract-fucoidan complex recovers the weight reduced by doxorubicin treatment through the combination treatment.

While the present invention has been particularly described with reference to specific embodiments thereof, it is apparent that this specific description is only a preferred embodiment and that the scope of the present invention is not limited thereby to those skilled in the art. That is, the practical scope of the present invention is defined by the appended claims and their equivalents.

What is claimed is:
1. A method of enhancing immune cells, comprising:
preparing a composition comprising an aronia extract-fucoidan complex composed of an aronia extract and a fucoidan; and

TABLE 1

| 37 day | WBC ($\times 10^3$ cells/µL) | RBC ($\times 10^6$ cells/µL) | HGB (g/dL) | HCT (%) | MCV (fL) | MCH (pg) | MCHC (g/dL) | PLT ($\times 10^3$ cells/µL) | NEUT (%) | LYM (%) | MONO (%) | EOS (%) | BASO (%) |
|---|---|---|---|---|---|---|---|---|---|---|---|---|---|
| PBS | 20.36 | 9.8 | 12.6 | 42.2 | 18.2 | 43 | 12.8 | 504 | 69.7 | 12.1 | 6.4 | 4.2 | 2.6 |
| Fu | 18.41 | 9.14 | 10.9 | 39.8 | 21.3 | 43.5 | 12 | 1242 | 67.9 | 14.3 | 4.6 | 6.1 | 1.5 |
| ABF | 14.82 | 10.81 | 14.3 | 39.8 | 21.3 | 43.5 | 12 | 1740 | 61.4 | 20.9 | 5.4 | 1.5 | 1.9 |
| Cyaplex-F8 | 17.01 | 10.47 | 12.7 | 47.8 | 17.3 | 44.2 | 13.3 | 2029 | 70.2 | 17.4 | 2.6 | 1. | 0.5 |
| DOX | 6.57 | 10.99 | 16.5 | 52.6 | 14.8 | 47.9 | 15 | 1954 | 33.9 | 53.7 | 4.3 | 3 | 3.2 |
| DOX + Cyaplex-F8 | 9.54 | 10.09 | 14.4 | 48.1 | 17.1 | 47.6 | 14.3 | 2600 | 46.4 | 36.7 | 5.1 | 3.4 | 2 |

<Example 6> Confirmation of Immune Cell Activity Effect of *Aronia* Extract-Fucoidan Complex As confirmed in the previous experiment, as the *aronia* extract-fucoidan complex was found to increase leukocyte levels, the effect of the *aronia* extract-fucoidan complex on immune cells was confirmed.

Doxorubicin (DOX) was treated with each 10 mg/kg in Balb/c (n=5) mice on the 1st and 5th day of the experiment (2 times in total), and 1,600 mg/kg of Fucoidan (Fu) (160 mg/mL) 500 µl, 200 mg/kg of *aronia* (ABF) 500 µl (20 mg/mL) and Fu 1,600 mg and ABF 200 mg/kg of *aronia* extract-fucoidan complex (Cyaplex-F8) 500 µl (Fu 160 mg, ABF 20 mg/mL) was orally administered daily, excluding doxorubicin treatment days.

Before doxorubicin treatment, 200 µl of blood was collected from all experimental groups, treated with 500 µL of RBC lysis buffer, reacted for 5 minutes at 4° C., diluted administering the composition to a subject, wherein the immune cells are selected from the group consisting of white blood cell, CD8 T cell, and NK cell,
wherein the aronia extract-fucoidan complex induces an expression of immune factor to increase an activity of the immune cells, wherein the immune factor is IL-6,
wherein the aronia extract-fucoidan complex comprises the aronia extract at a concentration of 50 µg/ml and the fucoidan at a concentration of 500 µg/ml in a mixture of phosphate buffer at pH 3 and distilled water,
wherein the aronia extract-fucoidan complex is in a form of spherical nanoparticles having an average diameter in a range of 50 nm to 500 nm,
wherein the aronia extract-fucoidan complex increases IL-6 expression, and the IL-6 expression induced by the aronia extract-fucoidan complex is higher than a sum of IL-6 expression induced by the aronia extract alone and the fucoidan alone.

\* \* \* \* \*